United States Patent
Sheu

(10) Patent No.: US 9,160,187 B2
(45) Date of Patent: Oct. 13, 2015

(54) OPTICAL CHARGER WITH LIGHT RECEIVERS AND LIGHT EMITTERS

(71) Applicant: HON HAI PRECISION INDUSTRY CO., LTD., New Taipei (TW)

(72) Inventor: Yi-Zhong Sheu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 199 days.

(21) Appl. No.: 13/864,261

(22) Filed: Apr. 17, 2013

(65) Prior Publication Data

US 2014/0176042 A1 Jun. 26, 2014

(30) Foreign Application Priority Data

Dec. 20, 2012 (TW) .............................. 101148841 A

(51) Int. Cl.
*H02J 7/00* (2006.01)
*H02J 7/35* (2006.01)

(52) U.S. Cl.
CPC ............. *H02J 7/0052* (2013.01); *H02J 7/0042* (2013.01); *H02J 7/35* (2013.01)

(58) Field of Classification Search
CPC .......... H02J 7/0042; H02J 7/0045; H02J 7/35
USPC .......................................... 320/101, 107, 112
See application file for complete search history.

(56) References Cited

U.S. PATENT DOCUMENTS

| | | | |
|---|---|---|---|
| 2007/0069684 A1* | 3/2007 | Ramsden ...................... | 320/101 |
| 2007/0114967 A1* | 5/2007 | Peng ............................. | 320/101 |
| 2008/0211458 A1* | 9/2008 | Lawther et al. ............... | 320/132 |
| 2009/0273309 A1* | 11/2009 | Kuo ............................... | 320/101 |
| 2011/0298419 A1* | 12/2011 | Tsai et al. ...................... | 320/108 |

* cited by examiner

*Primary Examiner* — Yalkew Fantu
*Assistant Examiner* — Manuel Hernandez
(74) *Attorney, Agent, or Firm* — Novak Druce Connolly Bove + Quigg LLP

(57) ABSTRACT

An optical charger includes a fixing block, a number of light receivers, a substrate, and a number of light emitters. The fixing block is used for receiving a battery. The light receivers are fixed on the fixing block. The battery is electrically connected to the light receivers. The substrate has a loading surface for loading the fixing block. The light emitters are positioned on the substrate and face the light receivers. The light emitters are electrically connected to an external power supply, and are used for converting electrical energy from the external power supply into optical energy and emitting light rays. The light receivers are used for receiving the light rays from the light emitters, and converting optical power of the light rays into electric energy. The battery receives and stores the electric energy.

9 Claims, 3 Drawing Sheets

OPTICAL CHARGER WITH LIGHT RECEIVERS AND LIGHT EMITTERS

BACKGROUND

1. Technical Field

The present disclosure relates to chargers, and particularly to an optical charger having light emitters and light receivers.

2. Description of Related Art

Currently, chargers can charge electronic devices using electromagnetic induction. Therefore, a great amount of electromagnetic wave will be produced during electrical charging process which can have adverse effect on health of the users.

Therefore, it is desirable to provide an optical charger that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
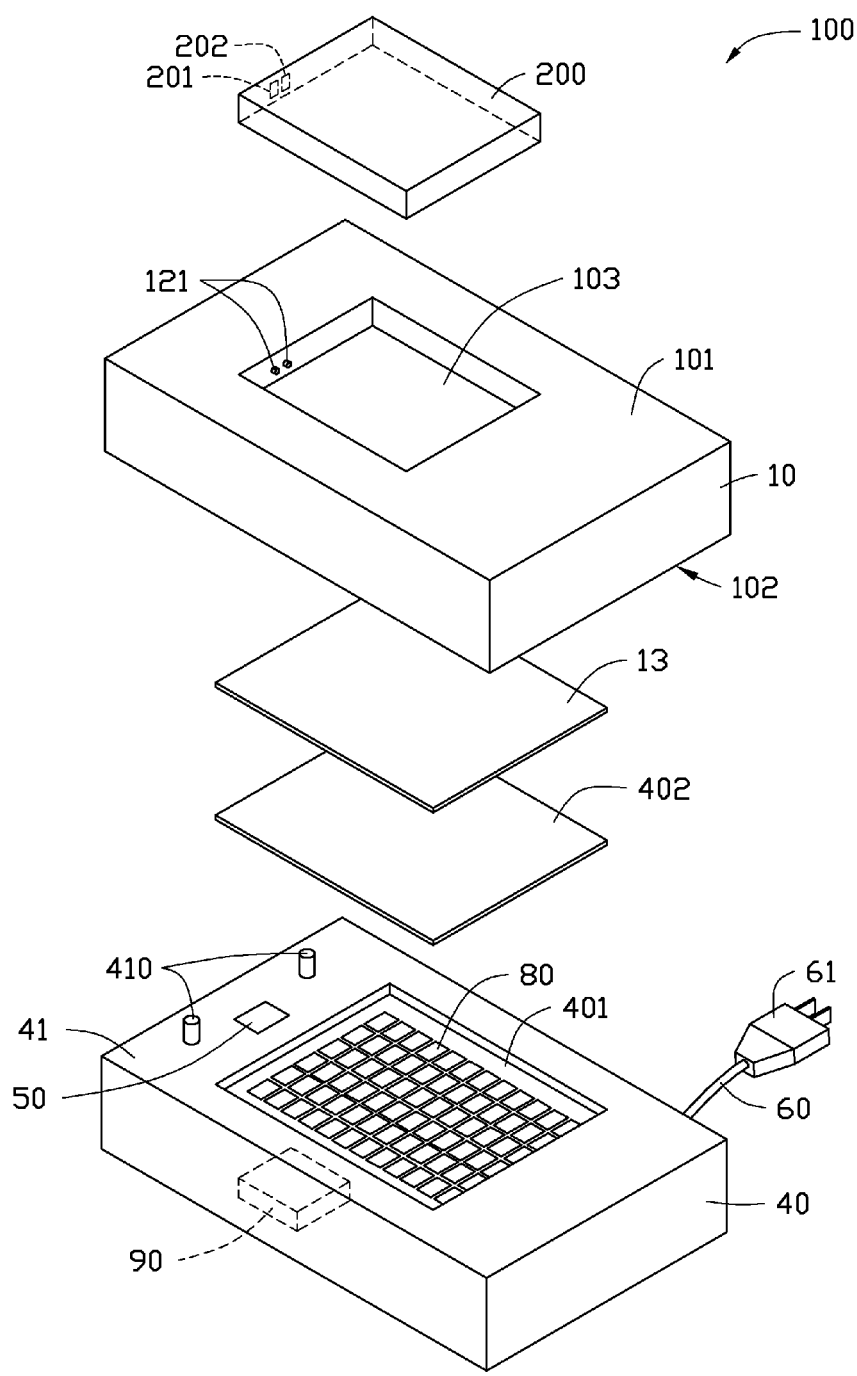
FIG. 1 is a schematic, exploded view of an optical charger, according to an exemplary embodiment, the optical charger including a fixing block and a sensor.
Figure 2:
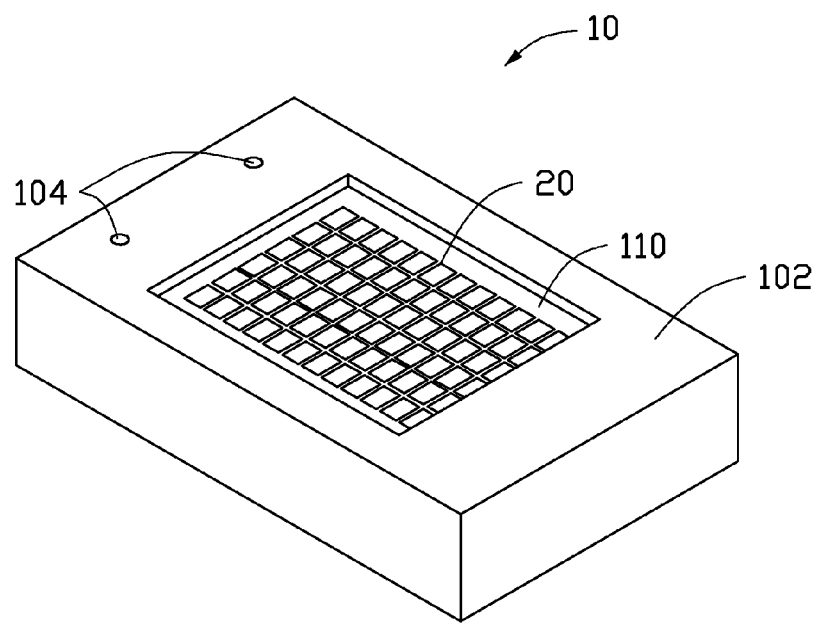
FIG. 2 is a schematic, isometric view of the fixing block of FIG. 1.

FIG. 1 and FIG. 2 illustrate an optical charger 100 in accordance with an embodiment. The optical charger 100 is used for charging a battery 200, and includes a fixing block 10, a number of light receivers 20, a substrate 40, a sensor 50, a power line 60, a power plug 61, a number of light emitters 80, and a controller 90.

The fixing block 10 is hollow cubic shaped, and has a first surface 101 and a second surface 102 opposite to the first surface 101. The first surface 101 defines a cavity 103 for receiving the battery 200. The shape of the cavity 103 is a fit with the shape of the battery 200. The battery 200 has a positive electrode 201 and a negative electrode 202. The cavity 103 has an inner side surface 103a. Two electrode terminals 121 are mounted the inner side surface 103a, and are spatially corresponding to the positive electrode 201 and the negative electrode 202. The two electrode terminals 121 are respectively inserted into the positive electrode 201 and the negative electrode 202, and thus the battery 200 is fixed in the cavity 103.

The second surface 102 defines a first receiving groove 110 for receiving the light receivers 110. The light receivers 110 are arranged in an array of rows and columns. The light receivers 110 are electrically connected to the two electrode terminals 121, and thus the light receivers 110 are electrically connected to the battery 200 when the battery 200 is received in the cavity 103. A first transparent cover 13 covers the first receiving groove 110 to seal the first receiving groove 110 to protect the light receivers 20. The light receivers 20 may be solar panels or optical-electrical diodes.

A first locating assembly 104 is fixed on the second surface 102.

The substrate 40 is hollow rectangular shaped, and includes a loading surface 41 for loading the fixing block 10. The sensor 50 is received in the substrate 40, and extends outwards from the loading surface 41.

Figure 3:
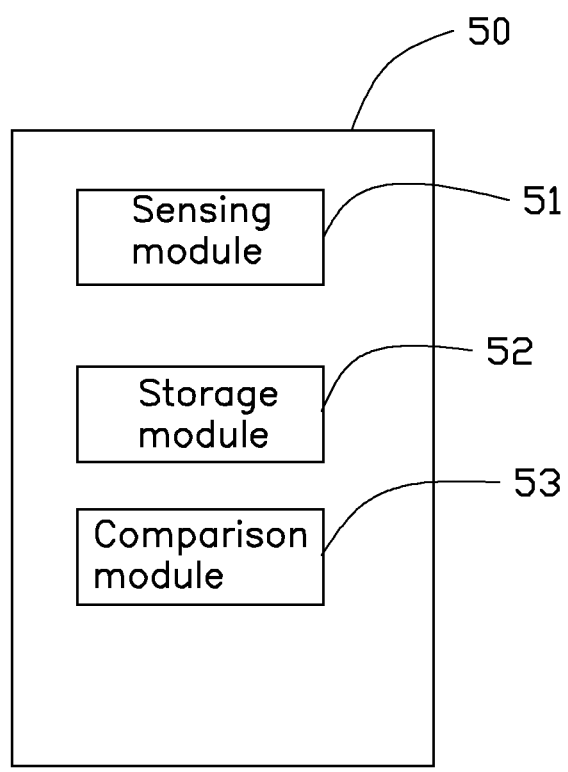
FIG. 3 is a function diagram of the sensor of the optical charger of FIG. 1.

The sensor 50 is used for sensing whether the fixing block 10 and the battery 200 have been received on the loading surface 41. In the embodiment, the sensor 50 is a pressure sensor, and is positioned on the loading surface 41. Referring to FIG. 3, the sensor 50 includes a sensing module 51, a storage module 52, and a comparison module 53. The sensing module 51 is used for sensing a pressing value pressed thereon. The storage module 52 stores a predetermined pressure value. The predetermined pressure value is substantially equal to a sum of the weight of the fixing block 10 and the weight of the battery 20. The comparison module 53 is used for comparing the pressure value sensed by the sensing module 51 and the predetermined pressure value. When the sensed pressure value is greater than or equal to the predetermined pressure value, the comparison module 53 determines the fixing blocks 10 and the battery 200 have been received in the loading surface 41. In contrast, when the sensed pressure value is less than the predetermined pressure value, the comparison module 53 determines the fixing blocks 10 and the battery 200 have not been received in the loading surface 41.

The loading surface 41 defines a second receiving groove 401. The light emitters 80 are received in the second receiving groove 401, and are arranged in an array of rows and columns. A second locating assembly 410 is positioned on the loading surface 41. The second locating assembly 410 is cooperated with the first locating assembly 104, and thus the light emitters 80 are corresponding to the light receivers 20. In the embodiment, the first locating assembly 104 includes two locating holes, the second locating assembly 410 includes two locating poles. The configuration of the first locating assembly 104 and the second locating assembly 410 are not limited to the embodiment. The light emitters 80 also can be laser diodes or light emitting diode.

A second transparent cover 402 covers the second receiving groove 401 to seal the second receiving groove 401 to protect the light emitters 80.

One end of the power cable 60 is received in the substrate 40, the other end of the power cable 60 extends out of the substrate 40 to be electrically connected to the power plug 61. The light receivers 20 are electrically connected to an external power source (not shown) through the power cable 60 and the power plug 61.

The controller 90 is received in the substrate 40, and is electrically connected to the sensor 50 and the light receivers 20. The controller 90 is used for controlling the light receivers 20 to be electrically connected to the power cable 60 or not. In particular, when the sensor 50 senses the fixing block 10 and the battery 200 have been positioned on the substrate 40, the controller 90 controls the light receivers 20 to be electrically connected to the power plug 60. When the sensor 50 senses the fixing block 10 and the battery 200 have not been positioned on the substrate 40, the controller 90 controls the light receivers 20 to be electrically disconnected to the power plug 60.

In use, the light emitters 80 transforms the electrical power from the external light source to optical power, and then emits light rays. The light receivers 20 receive the light rays from the light emitters 80 to obtain the optical power, and then transform the optical power to be electrical energy. The electrical power is stored in the battery 200.

By employing the optical charger 100, the optical charger 100 does not produce magnetic wave, and thus protects the health of the users.

In other embodiments, the fixing block 10 can be an electrical device, or can be inserted in an electrical device.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical charger for charging a battery, comprising:
a fixing block for fixing the battery;
a plurality of light receivers fixed on the fixing block and configured to convert optical power into electric power to charge the battery;
a substrate comprising a loading surface for loading the fixing block;
a plurality of light emitters positioned on the substrate, the light emitters facing the light receivers when the fixing block is positioned on the loading surface, the light emitters configured to obtain electrical energy from an external power supply and emit light rays to the light receivers;
a pressure sensor configured for sensing whether the fixing block and the battery are positioned on the loading surface, wherein the pressure sensor is exposed from the loading surface, the pressure sensor comprises a sensing module, a storage module, and a comparison module, the sensing module is configured for sensing a press applied thereon to obtain a press value, the storage module stores a predetermined pressure value, the predetermined pressure value is substantially equal to a sum of a weight of the fixing block and a weight of the battery, the comparison module is configured for comparing the obtained pressure value to the predetermined pressure value, when the obtained pressure value is greater than or equal to the predetermined pressure value, the comparison module determines that both of the fixing block and the battery are loaded on the loading surface; and
a controller electrically connected to the sensor and the light emitter and configured for controlling to power the light emitters on when the sensor senses that both of the fixing block and the battery are positioned on the loading surface.

2. The optical charger of claim 1, wherein the fixing block comprises a first surface away from the substrate, the first surface defines a cavity for receiving the battery, the shape of the cavity is a fit with the shape of the battery, the fixing block comprises two electrode terminals in the cavity, and the two electrode terminals are configured for electrically connecting to the battery.

3. The optical charger of claim 2, wherein the fixing block comprises a second surface opposite to the first surface, the second surface faces the substrate, and defines a first receiving groove, the light receivers are received in the first receiving groove, the optical charger comprises a first transparent cover covering the light receivers to seal the light receivers in the first receiving groove.

4. The optical charger of claim 3, wherein the loading surface defines a second receiving groove, the light emitters are received in the second receiving groove, and the optical charger comprises a second transparent cover covering the second receiving groove to seal the light emitters in the second receiving groove.

5. The optical charger of claim 3, wherein the fixing block comprises a first locating element on the second surface, the substrate comprises a second locating element on the loading surface, and the second locating element cooperate with the first locating element to align the light receivers with the light emitters respectively.

6. The optical charger of claim 1, wherein the light receivers are arranged in an array of rows and columns, and the light emitters are arranged in an array of rows and columns.

7. The optical charger of claim 1, wherein the fixing block is an electrical device.

8. The optical charger of claim 1, wherein the fixing block is inserted into an electrical device.

9. The optical charger of claim 1, wherein the light emitters are laser diodes or light emitting diodes, and the light receivers are photo diodes or solar panels.

* * * * *